Oct. 23, 1951 E. H. HUGENHOLTZ 2,572,343

AUTOMATIC SYNCHRONIZATION OF OSCILLATORS

Filed Dec. 6, 1947

INVENTOR.
EDUARD HERMAN HUGENHOLTZ
BY Fred M Vogel
AGENT.

Patented Oct. 23, 1951 2,572,343

UNITED STATES PATENT OFFICE 2,572,343

AUTOMATIC SYNCHRONIZATION OF OSCILLATORS

Eduard Herman Hugenholtz, Eindhoven, Netherlands, assignor to Hartford National Bank and Trust Company, Hartford, Conn., as trustee Application December 6, 1947, Serial No. 790,141
In the Netherlands September 20, 1946

Section 1, Public Law 690, August 8, 1946
Patent expires September 20, 1966

7 Claims. (Cl. 250—36)

If the frequency of a valve oscillator is controlled with the use of beat oscillations produced between the oscillations of this oscillator and another incoming or locally generated auxiliary oscillation, this is generally effected by means of a control voltage which is abstracted, for example, from a beat discriminator.

We must distinguish in this connection between the so-called retaining zone i. e. the zone lying between two cut-off frequencies within which the oscillator is capable of following the auxiliary oscillation and which is determined by the maximum variation of the control voltage and the tuning variation incidental thereto, and the so-called collecting zone, i. e. the frequency band within which, on the oscillator being connected into the circuit, this oscillator is sure to get under control of the auxiliary oscillation. The limits of this collecting zone are determined by the time constants of the control system and will frequently be much nearer to one another than those of the retaining zone, and this leads to uncertain results upon connection into the circuit.

The invention has for its object to reduce this disadvantage and the means used for this purpose according to the invention essentially consists in artificial, temporary extension of the collecting zone.

More particularly, this extension according to the invention may be ensured by causing the control voltage to vary periodically so long as the oscillator has not yet fallen into step.

Figure 1:
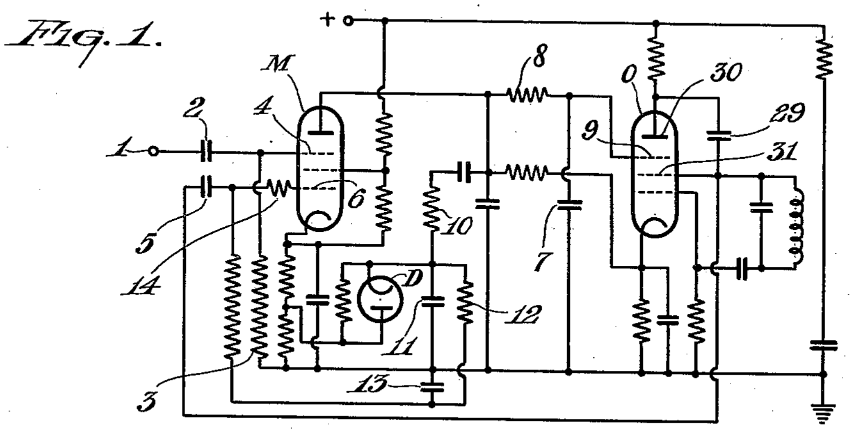
Figure 2:
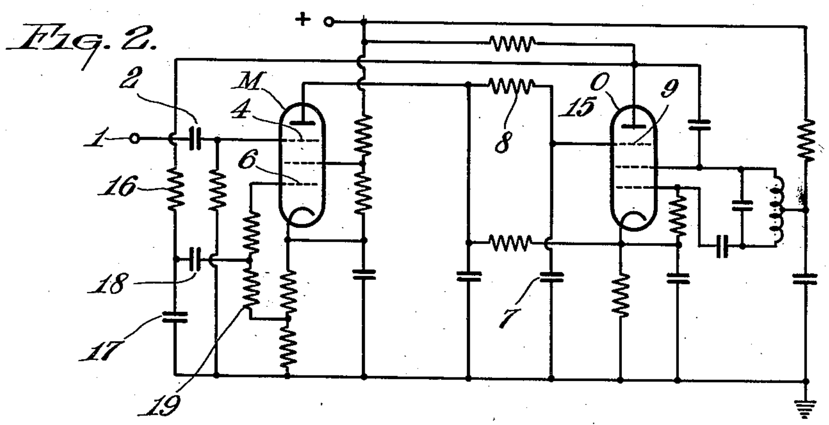
Figure 3:
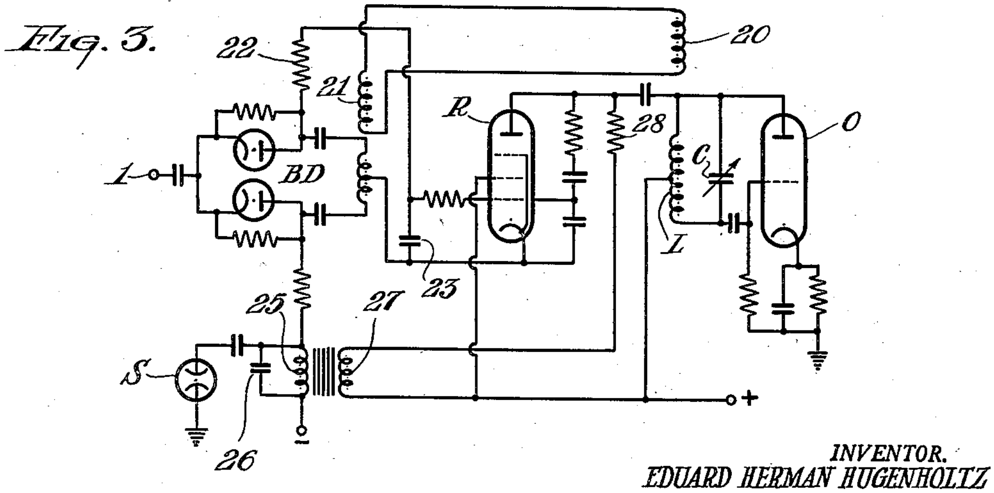

In order that the invention may be more clearly understood and readily carried into effect, it will now be described more fully with reference to the accompanying drawings, in which Figs. 1, 2 and 3 illustrate three embodiments.

The circuit-arrangement shown in Fig. 1 substantially comprises a mixing tube M and a valve oscillator O, the frequency of which is required to be controlled by an auxiliary oscillation which in the form of short impulses is set up across a terminal 1 and which is superimposed through a condenser 2 and a leak resistance 3 upon the suppressor grid 4 of the tube M. The oscillations produced by the oscillator O, the frequency of which is required, for example, to be equalized with a given higher harmonic of the impulse frequency applied to the grid 4 and maintained equal therewith, are applied through a condenser 5 to the control grid 6 of the tube M. At each impulse the anode circuit of this tube thus exhibits a current pulse, the integral value of which depends on the phase ratio between the impulses and the periods of the oscillator oscillation which simultaneously therewith reach the grid 6. In the case of synchronism this phase ratio will be constant or else it will vary with the periodicity of the beat frequency. A condenser 7 included in the said anode circuit is thus charged through a resistance 8 to produce a control voltage which is supplied to the suppressor grid 9 of the valve oscillator and which controls the oscillator frequency by variation of the phase of the backcoupling so far as the latter is effected across a condenser 29 connected between the anode 30 and the screen-grid 31 of the valve O, the time constant of the system 7, 8 being chosen to be such that although the beat frequency is applied to the grid 9 the higher impulse frequency is not.

The circuit-arrangement so far described is of the type known as impulse-controlled oscillator (I. C. O.) and still exhibits the disadvantage referred to in the opening part of the specification upon connection into the circuit.

In order to obviate this disadvantage the anode circuit of the mixing tube M has coupled to it, through a filter comprising a resistance 10 and a condenser 11, a diode D the positive detection voltage of which is supplied through a filter comprising a resistance 12 and a condenser 13 to the grid 6 of the mixing tube M, the time constants of this system being chosen to be such that only the beat frequency acts on the voltage across the diode D. If this voltage is fed to the grid 6, this grid will assume a slowly increasing, positive potential until the effect of the mixing tube consequently tends to decrease, which is assisted by a resistance 14 connected between the condenser 5 and the grid 6. The voltage across the diode D, then disappears, after which the grid 3 again becomes negative and so forth.

In this manner there is set up across the diode D and the grid 6 a slow oscillation of the order of a few periods per second, it being possible for the control voltage applied to the grid 9 of the oscillator O to vary practically between its two extreme values, so that the frequency of the oscillator will be capable of traversing practically the entire retaining zone, while slowly passing of necessity through the point of synchronization, so that falling into step is safeguarded. As soon as this occurs, the beat alternating oscillation disappears and thus the slow oscillation of the diode voltage also ceases.

A similar effect is obtained by the circuit-arrangement shown in Fig. 2, which substantially corresponds to that shown in Fig. 1, but is more simple in that the diode may be dispensed with.

Instead thereof the mixing tube is included in a circuit which is adapted to oscillate with a very low frequency. For this purpose the anode 15 of the tube O is coupled back through a resistance 16 and condensers 17 and 18 to the grid 6 of the mixing tube M. So long as the oscillator is not yet in step a slow oscillation is set up, due to the said back-coupling, until the point of synchronization is passed through. At this instant the rapidly operating control starts, with the result that the anode currents of M and O are further kept constant and the said oscillation ceases. The latter does not start again until the oscillator O would again fall out of step.

The slow performance of the said oscillation permits of realizing if desired a visual indication of the falling into and out of step of the oscillator, for example, with the use of a meter or of a magic eye.

Fig. 3 illustrates the use of the invention in a circuit-arrangement comprising a so called beat discriminator, which is designated BD and the constitution and operation of which are known per se, so that they will not here be explained more fully.

The beat oscillation reaching the terminal 1 is not pulsatory, as is the case in Figs. 1 and 2, but it is assumed to be substantially sinusoidal.

The beat oscillations produced in the case of synchronism between the control oscillations and those fed to the discriminator by an oscillator O through coupling coils 20 and 21 are converted by the discriminator into a control voltage which is applied through an RC-filter 22, 23 to the control grid 24 of a reactance tube R. The latter is connected in parallel in known manner with the tuning circuit LC of the oscillator O and varies the tuning thereof under the action of the control voltage applied to the grid 24.

The grid circuit of the reactance tube R includes in series with the discriminator BD the winding 25 of a transformer, said winding being tuned by a condenser 26 to a low frequency, for example, 100 cycles/sec. The free end of the winding 25 is connected to a point of negative potential which determines the mean bias voltage of the control grid 24.

The other winding 27 of this transformer is connected through a resistance 28 to the anode circuit of the tube R, so that this tube will generate an oscillation exhibiting the just mentioned low frequency so long as synchronism is not attained. As soon as this is the case, self-oscillation is suppressed by the control voltage of the discriminator, unless the feedback through the transformer 25, 27 would be so strong that the voltage produced thereby in the winding 25 would dominate the control voltage. Care should therefore be taken that the said feedback is not excessively strong. This and the operation of the circuit-arrangement as a whole may be checked by means of a test apparatus connected across the winding 25, for example, a neon tube S. This tube starts glowing as soon as the oscillator falls out of step and it again extinguishes on synchronism being restored.

What I claim is:

1. Apparatus for stabilizing the frequency of a controllable oscillator comprising a source of standard oscillations, mixing means to combine the frequencies of said oscillator and said source to produce a beat voltage which in the condition where the frequencies differ alternates at a rate corresponding to the frequency difference, control means responsive to said beat voltage and coupled to said oscillator for varying the frequency thereof to effect synchronism between said oscillator and said source, and positive feedback means coupled between the output of said mixing means and the input thereof for sustaining low-frequency oscillations in said mixing means when said beat voltage alternates.

2. Apparatus for stabilizing the frequency of a controllable oscillator comprising a source of standard oscillations, a mixer circuit including a cathode, first and second grids and an output electrode, means to apply the wave from said oscillator to one of said grids, means to apply said standard oscillations to the other of said grids to produce a beat voltage at said anode which in the condition where the frequencies differ alternates at a rate corresponding to the frequency difference between said oscillator and said source, control means responsive to said beat voltage and coupled to said oscillator for varying the frequency thereof to effect synchronism between said oscillator and said source, and positive feedback means coupled between the anode of said mixer circuit and one of said grids for sustaining low-frequency oscillations in said mixer circuit when said beat voltage is alternating.

3. An arrangement, as set forth in claim 2, wherein said positive feedback means includes a diode circuit whose input is coupled to the anode of said mixer circuit for detecting the beat voltage developed thereon, the output of said diode circuit being coupled to said one of said grids.

4. Apparatus for stabilizing the frequency of a controllable oscillator provided with an electron discharge device including a cathode, a control electrode and an anode, comprising a source of standard oscillations, a mixer circuit including a cathode, first and second grids and an output electrode, means to apply the wave from said oscillator to one of said grids, means to apply said standard oscillations to the other of said grids to produce a beat voltage at said output electrode which in the condition where the frequencies differ alternates at a rate corresponding to the frequency difference between said oscillator and said source, control means responsive to said beat voltage and coupled to said oscillator for varying the frequency thereof to effect synchronism between said oscillator and said source, and positive feedback means coupling the anode of said oscillator and one of said grids for sustaining low-frequency oscillations in said mixer circuit when said beat voltage is alternating.

5. Apparatus for stabilizing the frequency of a controllable oscillator comprising a standard source of producing a spectrum of harmonically-related frequency components, a mixer circuit including a cathode, first and second grids and an output electrode, means to apply said spectrum of components to one of said grids and the wave of said oscillator to the other of said grids, a low-pass filter coupled to said output electrode to derive therefrom solely an alternating beat voltage corresponding to the difference between said wave and the most proximate component of said spectrum, control means responsive to said beat voltage and coupled to said oscillator for varying the frequency thereof to effect synchronism between said oscillator and said most proximate frequency component, and positive feedback means for sustaining low-frequency oscillations in said mixer circuit when said beat voltage is alternating.

6. Apparatus for stabilizing the frequency of a controllable oscillator comprising a source of standard oscillations, a beat frequency discriminator coupled to said source and said oscillator to produce a beat voltage which in the condition where the frequencies differ alternates at a rate corresponding to the frequency difference therebetween, a reactance tube having its output coupled to said oscillator for varying the frequency thereof within a predetermined control range, said reactance tube having its input coupled to said discriminator and being responsive to said beat voltage to effect synchronism between said oscillator and said source, and positive feedback means for sustaining low-frequency oscillations in said discriminator and including a tuned low-frequency transformer intercoupling the output of said reactance tube to the input of said discriminator.

7. An arrangement, as set forth in claim 6, further including means coupled to said transformer to indicate the presence or absence of synchronism.

EDUARD HERMAN HUGENHOLTZ.

REFERENCES CITED

The following references are of record in the file of this patent:

UNITED STATES PATENTS

| Number | Name | Date |
|---|---|---|
| 2,379,764 | Thomas | July 3, 1945 |
| 2,423,229 | Crosby | July 1, 1947 |
| 2,464,193 | Wild | Mar. 8, 1949 |